(No Model.) 2 Sheets—Sheet 1.

W. GOWEN.
SAW HAMMERING MACHINE.

No. 372,670. Patented Nov. 8, 1887.

WITNESSES:
Lewis M. Ogden
Chas. L. Goss

INVENTOR
William Gowen
BY
ATTORNEY (No Model.) 2 Sheets—Sheet 2.
W. GOWEN.
SAW HAMMERING MACHINE.
No. 372,670. Patented Nov. 8, 1887.
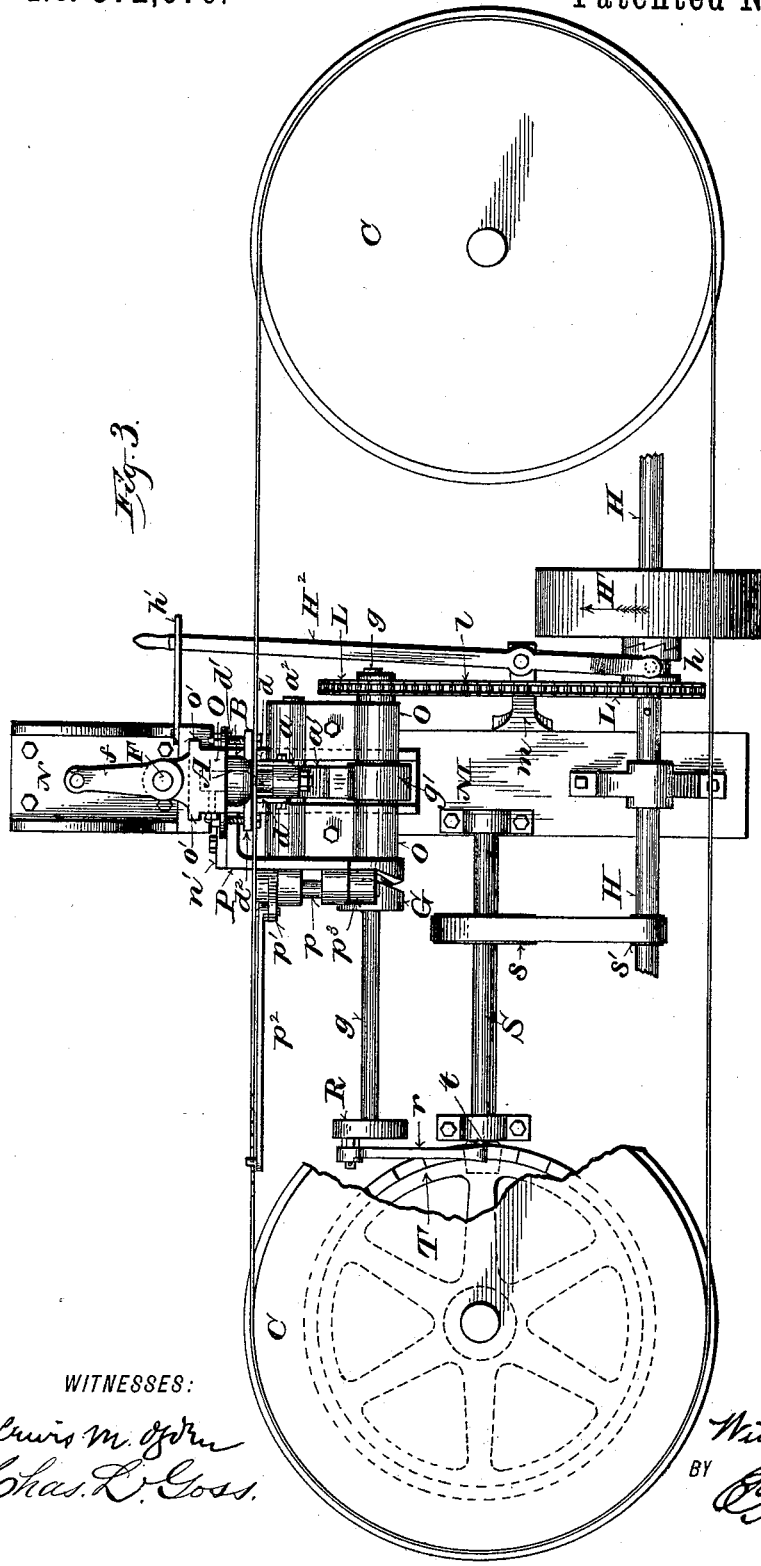
WITNESSES: INVENTOR
William Gowen
BY 
ATTORNEY

UNITED STATES PATENT OFFICE.

WILLIAM GOWEN, OF WAUSAU, WISCONSIN.

SAW-HAMMERING MACHINE.

SPECIFICATION forming part of Letters Patent No. 372,670, dated November 8, 1887.

Application filed January 18, 1887. Serial No. 224,702. (No model.)

*To all whom it may concern:*

Be it known that I, WILLIAM GOWEN, of Wausau, in the county of Marathon and State of Wisconsin, have invented certain new and useful Improvements in Saw-Hammering Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The objects of my invention are, first, to hammer a saw with facility and accuracy, and thereby produce the desired tension in the edges, and, second, to adapt the machine designed to accomplish that end for use in connection with the filing and jointing machines now in use, or with a portion thereof.

It consists, essentially, of a hammer and anvil adjustable transversely to the saw, mechanism for operating said hammer, a device for regulating the force of its blows, and mechanism to feed said saw between said hammer and anvil.

In the accompanying drawings like letters designate the same parts in the several figures.

Figure 1:
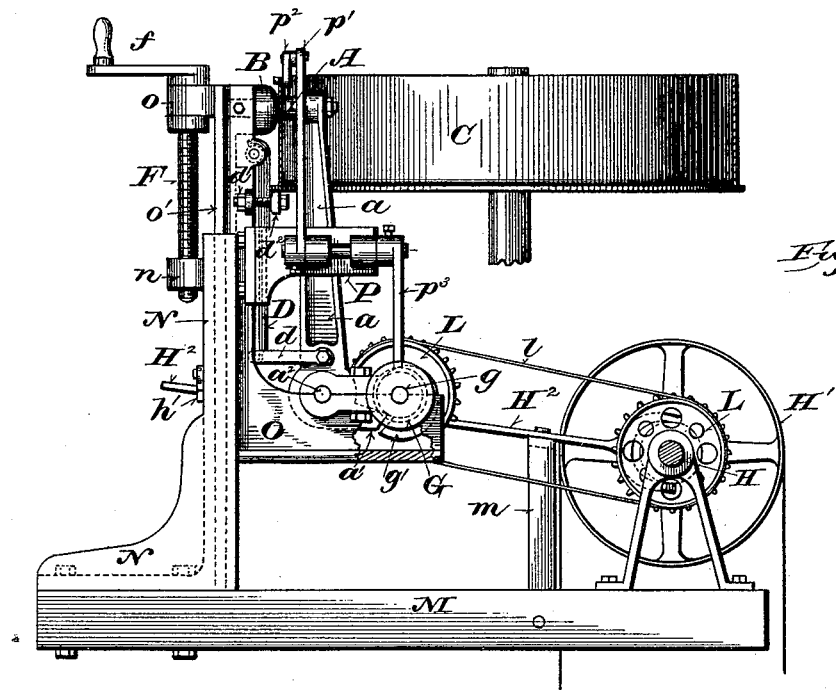
Figure 2:
Figure 2:
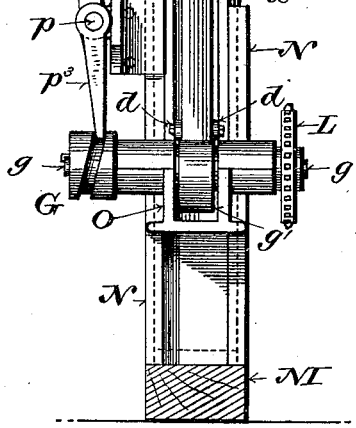

Figure 1 is a side elevation of my improved machine. Fig. 2 is an elevation of a portion of the same, taken at right angles to that shown in Fig. 1; and Fig. 3 is a plan view of the machine.

My improved machine is especially designed to be permanently set up in the mill where it is to be used in a position to operate upon a band-saw, which may be supported upon the same drums or pulleys employed in filing and jointing machines. To properly hammer a saw it is essential to strike with precision blows of uniform force and to support the saw in such a position and to move it or the hammer in such a manner that the blows will be dealt accurately upon said saw at certain intervals from each other—requisites impossible by the hand methods heretofore practiced, and to accomplish which is the design of the machine hereinafter described.

Referring to the accompanying drawings, C C represent the drums or pulleys of a filing or jointing machine, mounted, preferably, in the same horizontal plane upon upright shafts, and formed with flanges about their lower edges to retain the saw thereon.

O is an L-shaped slide, formed on each side of its upright limb with tongues $o'$ $o'$, arranged to slide vertically in grooves formed therefor in a standard, N, which is permanently secured to a timber, M, or any suitable part of the frame-work of the mill.

F is a vertical adjusting-screw, provided at the upper end with a crank, $f$, and journaled adjacent thereto in a box, $o$, on the upper end of the slide O, and engaging a nut, $n$, on the upper end of the standard N. To the upper end of the slide O, opposite the box $o$, is secured the anvil B, preferably formed of steel, with a rounded face.

A is the hammer, also preferably made of steel, with a rounded face, and secured in the upper end of the hammer-arm $a$, which is formed at the lower or opposite end with a right-angled extension, $a'$, and mounted adjacent thereto upon a horizontal shaft, $a^2$, journaled in suitable bearings provided therefor in the horizontal limb of the slide O. A leaf-spring, D, composed of any number of sections required to produce the desired stiffness, is connected at the lower end by links $d$ $d$ with the hammer-arm $a$, and bears at its upper end against a pin or lug on the slide O. A short distance below the upper end of said spring D it is also connected with the slide O by adjusting-bolts $d'$ $d'$, passing through a plate, $d^2$, placed over said spring, and ears formed on each side of said slide O. Upon a shaft, $g$, supported parallel with the hammer-shaft $a^2$ in bearings formed therefor in the horizontal limb of the slide O, is mounted the hammer-actuating cam $g'$ in the proper position to work with the extension $a'$ of the hammer-arm.

In suitable boxes formed therefor on bracket P, bolted to a projection, $n'$, of the slide O, is journaled the horizontal crank-shaft $p$, to one end of which is fixed the upright arm $p'$ and to the other end the depending arm $p^3$, which engages and works at its lower end with the spiral cam G on the adjacent end of the cam-shaft $g$. To the upper end of the arm $p'$ is hinged the gravitating pawl $p^2$, which is arranged to work with the teeth of the saw and feed the same intermittingly between the hammer and anvil.

H represents a counter-shaft, provided with a driving-pulley, H', loosely mounted thereon, a clutch, $h$, for throwing the machine into and out of gear, and a sprocket-wheel, L, connected by a chain belt, $l$, with a similar sprocket-wheel, L, on the cam-shaft $g$. The clutch $h$ is operated by means of a bifurcated lever, H², connected therewith and fulcrumed upon a bracket, $m$. By means of a latch, $h'$, hinged to the standard N, said lever H² may be locked and the clutch $h$ retained in engagement with the driving-pulley H'.

Referring to Fig. 3, the cam-shaft $g$ may be extended and provided with a crank-wheel, R, and pawl $r$, arranged to work with a ratchet-wheel, T, on the shaft of one of the pulleys C, and the pawl $p^2$ and its actuating mechanism thereby dispensed with, if desired.

S is a counter-shaft, provided with a pulley, $s$, driven by a belt from a pulley, $s'$, on the counter-shaft H, and with a friction wheel or gear, $t$, working with the wheel or gear T. The box supporting the shaft S, adjacent to the friction wheel or gear $t$, may be made vertically adjustable for the purpose of throwing said friction wheel or gear $t$ into and out of engagement with the wheel or gear T.

Although the hammer and anvil are shown as vertically adjustable and the saw-supporting pulleys as set horizontally, this arrangement may be reversed. In short, various modifications may be made in the construction and arrangement of my improved machine to adapt it to varying circumstances without departure from the principle of its operation or the spirit of my invention.

My improved machine operates as follows: The saw having been placed upon the pulleys C C with its back against the flanges on their lower edges, the pawl $p^2$ placed in engagement with the teeth of the saw, and the hammer and anvil adjusted vertically by means of the screw F to operate upon the saw at the desired distance from its edges, the machine is set in motion, and the cam $g'$, working with the extension $a'$ of the hammer-arm $a$, alternately lifts and releases the hammer A. With each elevation of the hammer A by the cam $g'$ from the anvil B the spring D is strained, and its recoil, when released, imparts the desired force to the blows of said hammer, which are regulated as desired by means of the adjusting bolts and nuts $d'$. The pawl $p^2$, reciprocated by means of the cam G and crank-arms $p'$ and $p^3$ and engaging the teeth of the saw, feeds the same by uniform intervals between the hammer and anvil.

In hammering a band-saw I prefer to begin at the center and hammer once around, and then to move the hammer and anvil a certain distance either side of the center and repeat the operation in parallel lines, alternating from one side to the other from the center toward the edges of the saw, until the desired effect is produced therein.

Whenever a continuous movement of the saw is desired, the pawl $p^2$ is thrown out of engagement therewith (or, in case the crank-wheel R and pawl $r$ are employed, the latter is disengaged from the ratchet on wheel T) and the friction wheel or gear $t$ is brought into engagement with the gear T.

I claim—

1. The combination, in a saw-hammering machine, of saw-supporting pulleys, the hammer and anvil supported in proper position to operate upon the saw carried by said pulleys, and a reciprocating pawl arranged to work with the teeth of said saw and feed the same between said hammer and anvil, substantially as and for the purposes set forth.

2. The combination, in a saw-hammering machine, with supporting-pulleys, of a slide adjustable transversely to the saw, a hammer and anvil mounted upon said slide, and mechanism for feeding the saw between said hammer and anvil, substantially as and for the purposes set forth.

3. The combination, in a saw-hammering machine, with saw-supporting pulleys, of a fixed supporting-standard, a slide movable vertically in ways on said standard, a screw arranged to adjust said standard vertically, and a hammer and anvil mounted upon said slide, substantially as and for the purposes set forth.

4. The combination, in a saw-hammering machine, with horizontal saw-supporting pulleys having flanges about their lower edges, of a vertically-adjustable slide, a vibrating hammer-arm journaled therein and provided at its free end with a hammer arranged to work with an anvil, also mounted upon said slide, a cam supported upon said slide and arranged to work with a projection of said hammer-arm, and an adjustable spring connected with said hammer-arm, substantially as and for the purposes set forth.

5. The combination, in a saw-hammering machine, with saw-supporting pulleys, of a fixed standard, a slide vertically adjustable thereon, means for raising and lowering said slide, a vibrating hammer-arm provided with a hammer and a right-angled projection and supported upon said slide, a cam also supported upon said slide and arranged to work with a projection on said hammer-arm, a leaf-spring secured to said slide and connected with said hammer-arm, and a screw or screws arranged to adjust the tension of said spring, substantially as and for the purposes set forth.

6. The combination, in a saw-hammering machine, with saw-supporting pulleys, a hammer and anvil adjustable transversely to said saw, and a pawl arranged to work with the teeth of the saw and connected with a vibrating arm, of a rock-shaft and a cam arranged to oscillate said rock-shaft, substantially as and for the purposes set forth.

7. The combination, in a saw-hammering machine, of saw-supporting pulleys, a vertically-adjustable hammer and anvil, a hammer-actuating cam movable with said hammer, and a counter-shaft provided with a wheel connected by a belt with a similar wheel on the cam-shaft, substantially as and for the purposes set forth.

8. The combination, in a saw-hammering machine, with saw-supporting pulleys, of a vertically-adjustable slide, and a hammer and anvil mounted on and movable with said slide, and mechanism for feeding the saw between said hammer and anvil, substantially as and for the purposes set forth.

9. The combination, in a saw-hammering machine, with a hammer and anvil, of saw-supporting pulleys and a wheel or gear mounted upon the shaft of one of said pulleys and arranged to work with another continuously-rotating wheel or gear, substantially as and for the purposes set forth.

In testimony that I claim the foregoing as my own I affix my signature in presence of two witnesses.

WILLIAM GOWEN.

Witnesses:
  CHAS. L. GOSS,
  M. E. BENSON.